United States Patent [19]

Stern

[11] Patent Number: 4,507,264

[45] Date of Patent: Mar. 26, 1985

[54] NICKEL BASE BRAZING ALLOY AND METHOD

[75] Inventor: Marvin J. Stern, Seattle, Wash.

[73] Assignee: Alloy Metals, Inc., Troy, Mich.

[21] Appl. No.: 445,818

[22] Filed: Dec. 1, 1982

[51] Int. Cl.$^3$ ............................................. C22C 19/05
[52] U.S. Cl. ................................. 420/443; 228/263.13
[58] Field of Search ..................... 420/443; 228/263 B

[56] References Cited

U.S. PATENT DOCUMENTS 4,312,682  1/1982  Herchenroeder .................. 420/443

Primary Examiner—R. Dean

Attorney, Agent, or Firm—Cullen, Sloman, Cantor, Grauer, Scott and Rutherford

[57] ABSTRACT

A nickel base diffusion brazing alloy suitable for brazing gamma and gamma prime strengthened superalloys at temperatures as low as 2150° F. The improved brazing alloy consists essentially of the following, in weight percent: 12 to 14% chromium, 2 to 4% tantalum, 2.5 to 4% boron, 0.01 to 0.06% yttrium, 2.5 to 5% aluminum, less than 0.03% carbon and the balance nickel, with incidental impurities. The preferred composition of the nickel base diffusion brazing alloy comprises 12.5 to 13.5% chromium, 2 to 4% tantalum, 2.5 to 3.5% boron, 0.01 to 0.03 yttrium, 3.5 to 4.5% aluminum, less than 0.03% carbon and the balance nickel, with incidental impurities.

6 Claims, No Drawings

NICKEL BASE BRAZING ALLOY AND METHOD

FIELD AND BACKGROUND OF THE INVENTION

The present invention relates to an improved nickel base high temperature brazing and diffusion brazing alloy containing chromium as the principal addition and a method of non-pressure diffusion brazing using the brazing alloy of this invention.

Diffusion brazing relies upon solid-state diffusion or movement of atoms in both directions across the interface of the joint between the brazing alloy and the base metal. It necessarily follows that diffusion brazing alloys are formulated to complement the base material of the parts to be joined. Diffusion brazing alloys are thus generally nickel, iron or cobalt base alloys, depending upon the composition of the base materials. High strength superalloys have presented a particular problem for diffusion brazing because of their limited wettability. The problem is to formulate a diffusion brazing alloy which complements the base materials to form a good braze or bond having the requisite physical properties, and which may be brazed at temperatures low enough for commercial applications. Higher brazing temperatures adversely affect the physical properties of the joint.

Various braze temperature depressants, including boron, have been utilized in diffusion brazing alloys, however the alloys have not been satisfactory for certain high strength alloys, particularly nickel base gamma prime strengthened alloys utilized in non-weldable aircraft turbine vanes and the like. Improved shear strength and uniformity of hardness is also required for such applications.

Examples of prior art diffusion brazing or bonding alloys include U.S. Pat. Nos. 3,759,629 and 3,700,427 assigned to General Electric Company, which disclose nickel based diffusion brazing alloys for brazing superalloys. U.S. Pat. Nos. 3,678,570 and 4,038,041 disclose methods and compositions for diffusion bonding wherein a thin alloy foil or layer is applied between the metals to be joined, substantially increasing the cost of diffusion brazing. The prior art also includes coating compositions including yttrium, which is an important constituent of the diffusion brazing alloy of the present invention, however such compositions would not be suitable for diffusion brazing superalloys contemplated by the present invention. U.S. Pat. No. 3,676,085 discloses a cobalt base coating for superalloys including yttrium. The disclosures of the above referenced prior art patents are incorporated herein by reference.

SUMMARY OF THE INVENTION

The brazing alloy of this invention is a medium chromium cobalt free NiCrAlY-type brazing alloy, suitable for high temperature brazing and diffusion brazing of superalloys, which permits gamma prime strengthening of conventional superalloys as well as the newer oxide dispersion strengthened and gamma prime strengthened mechanically alloyed superalloys. Unlike the prior art diffusion brazing alloys, the alloy of this invention permits "non-pressure" brazing with variable-gap joints as well as diffusion brazing with post braze diffusion heat treatment to homogenize the braze and base metal structures and improve the joint properties.

The nickel base high temperature brazing and diffusion brazing alloy of the present invention is particularly suitable for brazing nickel base superalloys of the gamma prime type, i.e. alloys having the tertiary phase $Ni_3AlTi$. The nickel base brazing alloy of this invention has the following general composition, in weight percent:

| Element | Weight Percent |
| --- | --- |
| Chromium | 12 to 14% |
| Tantalum | 2 to 4% |
| Boron | 2.5 to 4% |
| Yttrium or Lanthanum | 0.01 to 0.06% |
| Aluminum | 2.5 to 5% |
| Carbon | less than 0.03% |
| Nickel | balance |

The chromium, aluminum and yttrium combine in the brazed joint formed by the nickel base diffusion brazing alloy of the present invention to improve sulfidation and oxidation resistance. The resultant brazed joint has improved shear strength and uniformity of hardness at the fillet matrix formed in the joint. Further, the brazed joint has a thick homogeneous solid solution interface between the base metal and the brazed metal joint.

The diffusion brazing alloy of this invention is capable of brazing at a brazing temperature of 2150° to 2300° F. For example, the diffusion brazing alloy of this invention has been utilized to form brazed joints of gamma prime strengthened superalloys at 2150° and 2185° F. The diffusion brazing alloy of this invention is less expensive than the prior art brazing alloys requiring cobalt and may be used in the more economical powder forms, rather than foil, which is more expensive.

The preferred alloy of this invention has the following composition, in weight percent: 12.5 to 13.5% chromium, 2 to 4% tantalum, 2.5 to 3.5% boron, 0.01 to 0.03% yttrium or lanthanum, 3.5 to 4.5% aluminum, less than 0.03% carbon and the balance nickel, with incidental impurities. The most preferred or nominal composition of the diffusion brazing alloy of this invention has the following general composition, in weight percent: 13.1% chromium, 3.2% tantalum, 3% boron, 0.01 to 0.02% yttrium, 4.15% aluminum, less than 0.03% carbon and the balance nickel, with incidental impurities.

As described, the nickel base brazing diffusion brazing alloy of this invention is capable of brazing gamma prime strengthened superalloys, resulting in improved microstructure of the brazed joint having a uniformity of hardness, particularly at the fillet matrix and a uniform thick solid solution interface between the base material and the brazed metal joint. Further, the brazed joint has demonstrated the highest and most consistent improved shear strength at 1500° F. on Martin Marietta Corporation Mar M 246 superalloy turbine blades.

The non-pressure brazing method of this invention includes brazing the superalloy joint using the alloy of this invention in powdered form, followed by a post braze heat treatment or diffusion cycle at a temperature of 50° to 100° F. below the brazing temperature, which diffuses the brazing alloy into the superalloy base structures. This results in a more homogeneous joint with improved properties.

Other advantages and meritorious features of the diffusion brazing alloy of the present invention will be more fully understood from the appended claims and the following description of the preferred embodiments.

DESCRIPTION OF THE PREFERRED EMBODIMENTS

Examination of brazed joints between certain nickel base gamma prime strengthened superalloys using the diffusion brazing alloy of this invention exhibit improved strength, uniformity of hardness and improved microstructure, particularly with nickel base gamma prime strengthened superalloys containing cobalt and molybdenum. As described above, gamma prime strengthened superalloys contain the tertiary phase Ni₃AlTi. Further, the elimination of cobalt in the diffusion brazing alloy of this invention reduces the cost of the brazing alloy and results in an improved bond between certain gamma prime strengthened superalloys.

In brazed joints formed with the diffusion brazing alloy of the present invention, chromium, aluminum and yttrium combine to form an improved microstructure, which is more resistant to sulfidation and oxidation. The improved strength of the brazed joint is demonstrated in shear socket tests using gamma prime strengthened superalloys. Micrographs of the brazed joints also exhibit excellent uniformity of hardness at the fillets formed in the brazed joint and a thick solid solution interface between the base metal and the brazed metal joint.

The nickel base diffusion brazing alloy of this invention has the following composition, in weight percent:

| | |
|---|---|
| Chromium | 12 to 14% |
| Tantalum | 2 to 4% |
| Boron | 2.5 to 4% |
| Yttrium or Lanthanum | 0.01 to 0.06% |
| Aluminum | 2.5 to 5% |

The diffusion brazing alloy preferably has less than 0.03% carbon and the balance nickel, with incidental impurities. The preferred diffusion brazing alloy of the present invention has the following composition, in weight percent:

| | |
|---|---|
| Chromium | 12.5 to 13.5% |
| Tantalum | 2 to 4% |
| Boron | 2.5 to 3.5% |
| Yttrium | 0.01 to 0.03% |
| Aluminum | 3.5 to 4.5% |
| Carbon | less than 0.03% | with the balance nickel and incidental impurities. The nominal or most preferred composition of the diffusion brazing alloy of this invention comprises the following, in weight percent: 13.1% chromium, 3.2% tantalum, 3% boron, 0.01 to 0.02% yttrium, 4.15% aluminum, less than 0.02% carbon, and the balance nickel, with incidental impurities.

As described above, the diffusion brazing alloy of this invention is particularly formulated to complement gamma prime strengthened superalloys containing cobalt and molybdenum. Several gamma prime strengthened superalloys fall within this classification. The diffusion brazing alloys disclosed in the prior art have not been very successful in brazing such superalloys and the brazed joints have been subject to embrittlement and phase separation. Examples of such nickel base gamma prime strengthened superalloys include the Mar M family of superalloys sold by Martin Marietta Corporation, Special Metals and others. The Mar M family of superalloys is used by the aircraft industry for such applications as turbine blade and vane assemblies, etc. Another nickel base solid-solution strengthened superalloy which may be brazed by the diffusion brazing alloy of this invention is Hastelloy X, which is a nickel, chromium molybdenum alloy strengthened with iron and cobalt. The Mar M family of alloys include Mar M 200 and Mar M 200 hafnium, Mar M 246 and 247. The nominal formulation of Mar M 246 is 9% chromium, 10% cobalt, 2.5% molybdenum, 10% tungsten, 1.5% tantalum, 5.5% aluminum, 1.5% titanium and the balance nickel, all in weight percent.

It will be understood that the formulation of the diffusion brazing alloy of this invention is not dramatically different from the prior art, however a brazed joint of superalloys using the brazing alloy of this invention has a substantial and unexpectedly improved microstructure. Further, the improved microstructure results in substantial improvements in hardness, strength and resistance to oxidation and sulfidation. The following is a review of the elements of the diffusion brazing alloy of this invention and their function in the combination.

Aluminum is a gamma prime strengthener and slightly suppresses the brazing temperature. More importantly, as described above, aluminum combines with chromium and yttrium or lanthanum in the brazed joint to improve oxidation and sulfidation resistance. It is understood that aluminum and chromium oxides improve the oxidation resistance of a brazed joint. Aluminum oxides form adherent coatings and yttrium works with the aluminum and chromium to stabilize oxidation and sulfidation. Yttrium enhances the high temperature capabilities of the brazing alloy. In the nickel base brazing alloy of this invention, yttrium modifies or affects the basic structure of the alloy, affecting the grain boundaries and stabilizing the aluminum. The prior art has suggested the use of yttrium in cobalt base coatings for superalloys, however the prior art has not suggested the inclusion of yttrium in diffusion brazing alloys, particularly nickel base diffusion brazing alloys as set forth herein. It will be understood that lanthanum can be substituted for yttrium in certain applications.

Boron is included in the diffusion brazing alloy of this invention primarily as a temperature suppressant, as suggested by the prior art cited above, see U.S. Pat. No. 3,759,692. The diffusion brazing alloy of the present invention may be used to braze nickel base gamma prime strengthened superalloys at temperatures of 2150° to 2300° F. and better matches the solid solution temperatures of the base metals referred to herein. Tantalum is also a recognized melting point depressant in diffusion brazing alloys as well as a solid solution strengthener and promotes gamma prime strengthening. The lower chromium content, as well as the higher boron levels and the presence of a rare earth element (e.g. yttrium or lanthanum) result in improved properties. It will be understood, however, that the specific formulation for the diffusion brazing alloy will be dependent upon the formulation of the superalloy to be brazed. As set forth above, the diffusion brazing alloy must be formulated to complement the superalloy to be brazed.

The following are examples of the nickel base diffusion brazing alloy of this invention:

| Element | Example 1 | Example 2 | Example 3 | Example 4 |
|---|---|---|---|---|
| Chromium | 13.09 | 13.5 | 12.7 | 12.9 |

-continued

| Element | Example 1 | Example 2 | Example 3 | Example 4 |
|---|---|---|---|---|
| Tantalum | 3.19 | 3 | 2.8 | 2.93 |
| Boron | 3 | 3.5 | 2.8 | 2.75 |
| Yttrium | .015 | .02 | .025 | .018 |
| Aluminum | 4.14 | 4.3 | 4 | 3.8 |
| Carbon | .02 | .02 | .02 | .018 |
| Nickel | balance | balance | balance | balance |

It will be seen from the above Examples that the nominal or most preferred composition of the diffusion brazing alloy of this invention is the following, in weight percent: 13.1% chromium, 3.2% tantalum, 3% boron, about 0.015% yttrium, about 4.15% aluminum, less than 0.03% carbon and the balance nickel, with incidental impurities.

As described above, the diffusion brazing alloy of this invention has improved strength in brazed joints of gamma prime strengthened superalloys. In actual shear socket tests using a 0.252 inch diameter tube socket joint with the Mar M 246 superalloy, consistent shear tests were obtained at 1500° F. at 64,000 to 66,000 psi. The brazing alloys have a liquidus temperature range of 2088° to 2115° F. and will form brazes at temperatures as low as 2150° F.

Micrographic analysis of brazed joints using the diffusion brazing alloy of this invention shows a substantially improved microstructure and uniformity of hardness across the brazed joint as follows. T-specimens of Hastelloy X were brazed at to 2150° and 2185° F. for 20 minutes. Hastelloy X has the following nominal composition, in weight percent: 22% chromium, 9% molybdenum, 18% iron, 0.5 to 2.5% cobalt, less than 1% tungsten, 0.05 to 0.15% carbon and the balance nickel. The hardness converted to Rockwell was found to be the following: $R_B$ 92.8 to $R_C$ 24 for the base metal, $R_C$ 31.8 for the solid solution, $R_C$ 34.3 to $R_C$ 30.5 for the secondary phases and $R_C$ 37.7 for the top member in the diffusion zone. In a further test of a T-specimen of Hastelloy-X brazed with the diffusion brazing alloy of Example 1 at 2185° F. for 20 minutes, the following microhardnesses were measured: $R_B$ 91.3 to 95.8 for the base metal, $R_C$ 39.8 for the diffusion zone on the lower member, $R_C$ 32.8 in the solid solution interface, 36.3 in the diffusion zone of the upper member and the secondary phases having hardnesses of $R_C$ 39.1 and 54.8.

Based upon the above, it is evident that the diffusion brazing alloy of this invention has an improved shear strength over the prior art in the nickel base gamma prime strengthened superalloys tested. The micrographs show a uniformity of hardness at the brazed fillets. Further, the micrographic analysis shows a thicker solid solution interface between the base and the joint metal. These improvements are significant in commercial applications where strength is a prime prerequisite.

It is also possible to achieve a unique diffusion braze effect with superalloys using the alloy of this invention as a conventional or "non-pressure" powdered brazing alloy, followed by post-braze heat treatment. The heat treatment or diffusion cycle should be at a temperature 50° to 100° F. cooler than the brazing temperature and requires two to four hours. The heat treatment diffuses the brazing alloy into the base metal structures of the superalloys, resulting in a more homogeneous joint and improved properties, including ductility, remelt temperature and strength. The non-pressure brazing method of this invention then includes applying the preferred brazing alloy in powdered or paste form to a superalloy joint, heating the joint to the brazing temperature, preferably in a vacuum furnace, followed by post-braze heat treatment or a diffusion cycle in the furnace at a temperature 50° to 100° F. cooler than the brazing temperature.

It will be understood that various modifications may be made to the diffusion brazing alloy of this invention within the ranges specified and claimed, as follows.

I claim:

1. A nickel base diffusion brazing alloy suitable for brazing nickel base superalloys of the gamma prime type, which consists essentially of the following composition, in weight percent:

| Element | Percentage |
|---|---|
| Chromium | 12.5 to 13.5% |
| Tantalum | 2 to 4% |
| Boron | 2.5 to 3.5% |
| Yttrium or Lanthanum | 0.01 to 0.03% |
| Aluminum | 3.5 to 4.5% |
| Carbon | less than 0.03% |
| Nickel | balance | wherein the chromium, aluminum and yttrium combine in the brazed joint to improve sulfidation and oxidation resistance, and incidental impurities.

2. A nickel base diffusion brazing alloy suitable for bonding gamma prime superalloys at about 2150° F. to 2300° F. and having improved uniformity of hardness at the fillet of the brazed joints, consisting essentially of the following general composition, in weight percent:

| Element | Percentage |
|---|---|
| Chromium | 13% |
| Tantalum | 3% |
| Boron | 3% |
| Yttrium | 0.01 to 0.03% |
| Aluminum | 4% |
| Nickel | balance | the bonding alloy having less than 0.03% carbon and incidental impurities.

3. A nickel base diffusion brazing alloy for brazing gamma-gamma prime type nickel base superalloys at temperatures including about 2150° to 2300° F. and having improved uniformity of hardness at the microfillets of bonded joints and a thicker solid solution interface between the base metal and the brazed metal joint, consisting essentially of the following composition, in weight percent:

| Element | Percentage |
|---|---|
| Chromium | 12 to 14% |
| Tantalum | 2 to 4% |
| Boron | 2.5 to 4% |
| Yttrium | 0.01 to 0.06% |
| Aluminum | 2.5 to 5% | the brazing alloy having less than 0.03% carbon and the balance nickel, with incidental impurities, and wherein the chromium, aluminum and yttrium combine in the brazed joint to improve sulfidation and oxidation resistance.

4. The nickel based diffusion brazing alloy defined in claim 3, wherein the concentration of boron is 2.5 to 3.5% and the concentration of yttrium is 0.01 to 0.03%.

5. A nickel base diffusion brazing alloy for brazing superalloys consisting essentially of the following composition, in weight percent:

| Element | Percentage |
|---------|------------|
| Chromium | 13.1% |
| Tantalum | 3.2% |
| Boron | 3% |
| yttrium | 0.015% |
| Aluminum | 4.15% |
| Carbon | less than 0.03% |
| Nickel | balance | and incidental impurities.

6. A method of diffusion brazing without pressure, including forming a joint consisting essentially of superalloys of the gamma primed type, applying a brazing alloy in powdered form to said joint of the following composition, in weight percent:

| Element | Percentage |
|---------|------------|
| Chromium | 12.5 to 13.5% |
| Tantalum | 2 to 4% |
| Boron | 2.5 to 3.5% |
| Yttrium or Lanthanum | 0.01 to 0.03% |
| Aluminum | 3.5 to 4.5% |
| Carbon | less than 0.03% |
| Nickel | balance: | heating the joint of superalloys in a furnace to the brazing temperature of the alloy, followed by a diffusion cycle in said furnace of two to four hours at a temperature of 50° to 100° F. cooler than the brazing temperature.

* * * * *